(12) United States Patent
Nyman

(10) Patent No.: US 12,304,788 B2
(45) Date of Patent: May 20, 2025

(54) MOBILE DEVICE, A SYSTEM, AND A METHOD FOR HANDLING OBJECTS PROVIDED WITH RADIO FREQUENCY IDENTIFIERS

(71) Applicant: TURCK VILANT SYSTEMS OY, Espoo (FI)

(72) Inventor: Henrik Nyman, Espoo (FI)

(73) Assignee: TURCK VILANT SYSTEMS OY, Espoo (FI)

( * ) Notice: Subject to any disclaimer, the term of this patent is extended or adjusted under 35 U.S.C. 154(b) by 473 days.

(21) Appl. No.: 17/883,198

(22) Filed: Aug. 8, 2022

(65) Prior Publication Data

US 2023/0050026 A1 Feb. 16, 2023

(30) Foreign Application Priority Data

Aug. 10, 2021 (FI) ...................................... 20215845

(51) Int. Cl.
*B66F 9/075* (2006.01)
*G06K 7/10* (2006.01)
*H04B 17/318* (2015.01)

(52) U.S. Cl.
CPC ........ *B66F 9/0755* (2013.01); *G06K 7/10099* (2013.01); *G06K 7/10376* (2013.01); *H04B 17/318* (2015.01)

(58) Field of Classification Search
CPC .................................................... H04B 17/318
See application file for complete search history.

(56) References Cited

U.S. PATENT DOCUMENTS 7,924,141 B2 * 4/2011 Tuttle ................. G06K 7/10356
340/5.74
7,973,644 B2 * 7/2011 Tuttle ................... G06K 7/0008
340/10.5

(Continued)

OTHER PUBLICATIONS

Finnish Search Report dated Mar. 15, 2022, for FI Application No. 20215845, 2 pp.

(Continued)

*Primary Examiner* — Jonathan M Dager
(74) *Attorney, Agent, or Firm* — NIXON & VANDERHYE

(57) ABSTRACT

A mobile device for handling objects includes a radio frequency identifier reader for receiving radiation emitted by object-specific radio frequency identifiers attached to the objects and radiation emitted by fixed radio frequency identifiers. The mobile device includes a processing system that computes a speed estimate for the mobile device based on a distance between two fixed radio frequency identifiers and a time-difference between receptions of radiation from these fixed radio frequency identifiers. The processing system determines, based on radiation received from each object-specific radio frequency identifier, a movement indicator indicative of movement of the mobile device with respect to the corresponding object. When the speed estimate exceeds a threshold, the processing system classifies objects which are moving in accordance with the movement indicator to be objects non-belonging to a load of the mobile device. The mobile device can be for example a forklift.

16 Claims, 4 Drawing Sheets

(56) References Cited

U.S. PATENT DOCUMENTS

| | | | | |
|---|---|---|---|---|
| 8,188,863 | B2* | 5/2012 | Rinkes | B66F 9/0755 |
| | | | | 340/572.1 |
| 8,731,785 | B2* | 5/2014 | McCabe | B60G 17/016 |
| | | | | 187/222 |
| 9,007,178 | B2* | 4/2015 | Nikitin | G06K 7/10009 |
| | | | | 340/572.1 |
| 9,047,522 | B1* | 6/2015 | Nikitin | G06K 7/10009 |
| 9,424,450 | B2* | 8/2016 | Stimming | G06K 5/00 |
| 10,049,244 | B2* | 8/2018 | Lauria | G06K 7/10366 |
| 10,401,471 | B2* | 9/2019 | Hyatt | G06Q 10/0833 |
| 10,796,110 | B2* | 10/2020 | Suzuki | G06K 7/10336 |
| 11,068,841 | B1 | 7/2021 | Lui et al. | |
| 11,747,432 | B2* | 9/2023 | Hyatt | G06Q 10/087 |
| | | | | 342/450 |
| 2002/0070862 | A1* | 6/2002 | Francis | G06Q 10/087 |
| | | | | 340/988 |
| 2006/0022815 | A1* | 2/2006 | Fischer | G06K 7/10356 |
| | | | | 340/505 |
| 2006/0255951 | A1* | 11/2006 | Roeder | H01Q 1/22 |
| | | | | 340/572.1 |
| 2007/0099623 | A1* | 5/2007 | Stephensen | H04L 67/52 |
| | | | | 455/446 |
| 2009/0021376 | A1 | 1/2009 | Calvarese | |
| 2009/0207024 | A1* | 8/2009 | Schatz | G06K 7/10079 |
| | | | | 340/572.1 |
| 2009/0231107 | A1* | 9/2009 | Sato | H04W 52/36 |
| | | | | 340/10.3 |
| 2009/0322489 | A1* | 12/2009 | Jones | G06V 10/24 |
| | | | | 340/10.3 |
| 2010/0066503 | A1 | 3/2010 | Rhie et al. | |
| 2012/0235817 | A1 | 9/2012 | Forster | |
| 2014/0197926 | A1* | 7/2014 | Nikitin | G06K 7/10009 |
| | | | | 340/10.1 |
| 2017/0200031 | A1 | 7/2017 | McCann et al. | |
| 2019/0188426 | A1* | 6/2019 | Suzuki | G06Q 20/208 |

OTHER PUBLICATIONS

Finnish Communication of Acceptance—section 29 a of Patents Decree, dated Mar. 15, 2022, for FI Application No. 20215845, 5 pp.

* cited by examiner

MOBILE DEVICE, A SYSTEM, AND A METHOD FOR HANDLING OBJECTS PROVIDED WITH RADIO FREQUENCY IDENTIFIERS

CROSS-REFERENCE TO RELATED APPLICATION

This application claims priority to FI 20215845 filed Aug. 10, 2021, the entire contents of which are hereby incorporated by reference.

BACKGROUND OF THE INVENTION

Field of the Invention

The disclosure relates to a mobile device for handling objects each being provided with an object-specific radio frequency identifier "RFID". The mobile device can be, for example but not necessarily, a forklift. Furthermore, the disclosure relates to a system and a method for handling objects each being provided with an object-specific radio frequency identifier. Furthermore, the disclosure relates to a computer program for handling objects each being provided with an object-specific radio frequency identifier.

Description of the Related Art

In many cases, it is important that a management system can determine which objects provided with radio frequency identifiers "RFID" belong to a load of a forklift or another mobile device for handling the objects. Under certain conditions, the above-mentioned task can be however challenging because RFID-readers may read RFIDs relating to objects which are in the operating environment of a forklift or another mobile device, but which do not belong to the load of the forklift or other mobile device. Extraneous RFID reads like these may disturb the traceability of the objects and/or cause other difficulties in the management of the objects.

Publication US20090207024 describes a system for detecting whether an object provided with a RFID is a part of a load of a forklift or another mobile device. The system utilizes spatial identification technology to define a space in front of a forklift as a load space, where the load space may be either a certain volume or area in front of the forklift. Objects within that volume or area in front of the forklift are considered on the load, while objects outside of that area are considered not on the load. The spatial identification technology requires, however, careful tuning of power limits and/or other factors to achieve a situation where objects belonging to the load space are identified in a sufficiently reliable way.

There are also other known methods but many of them have their own limitations. For example, some known methods require that a RFID-signal is modulated in a certain way, e.g. there may be a requirement that a RFID-signal comprises in-phase "I" and quadrature "Q" components.

Therefore, there is still a need for technical solutions for determining which objects provided with radio frequency identifiers belong to a load of a forklift or another mobile device for handling the objects.

SUMMARY OF THE INVENTION

The following presents a simplified summary in order to provide a basic understanding of some embodiments of the invention. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new mobile device for handling objects each being provided with an object-specific radio frequency identifier "RFID". The mobile device can be, for example but not necessarily, a forklift. A mobile device according to the invention comprises:

a radio frequency identifier reader configured to receive radiation emitted by the object-specific radio frequency identifiers and radiation emitted by fixed radio frequency identifiers attached to one or more fixed structures, e.g. a floor and/or walls and/or a ceiling, located in an operating environment of the mobile device, and a processing system configured to:
compute a speed estimate for the mobile device based on a distance between first and second ones of the fixed radio frequency identifiers and a time-difference between receptions of radiation from the first and second ones of the fixed radio frequency identifiers,
determine, based on radiation received from each of the object-specific radio frequency identifiers, a movement indicator indicative of movement of the mobile device with respect to the object provided with the object-specific radio frequency identifier under consideration, and
classify a first one of the objects to be an object belonging to a load of the mobile device and a second one of the objects to be an object non-belonging to the load of the mobile device in response to a situation in which i) the computed speed estimate exceeds a threshold and ii) the movement indicator related to the second one of the objects is indicative of a greater movement speed than the movement indicator related to the first one of the objects.

As the determination whether an object belongs to the load is based on the radiation received from the object-specific RFIDs and from the fixed RFIDs, there is no need to estimate e.g. the location of the object and/or the distance between the mobile device and the object. Thus, there is no need for tuning e.g. power limits and/or other similar factors related to RFID reads. Furthermore, the above-described approach is applicable with differently modulated RFID-signals. Thus, there is no requirement that a RFID-signal should be modulated in a certain way, e.g. so that it comprises in-phase and quadrature components.

In accordance with the invention, there is also provided a new system for handling objects each being provided with an object-specific radio frequency identifier. A system according to the invention comprises:

at least one mobile device according to invention for handling the objects, and fixed radio frequency identifiers attached to one or more fixed structures located in an operating environment of the mobile device.

In accordance with the invention, there is also provided a new method for handling objects each being provided with an object-specific radio frequency identifier. A method according to the invention comprises:

receiving, at a mobile device for moving the objects, radiation emitted by the object-specific radio frequency identifiers and radiation emitted by fixed radio frequency identifiers attached to one or more fixed structures located in an operating environment of the mobile device, computing a speed estimate for the mobile device based on a distance between first and second ones of the fixed radio frequency identifiers and a time-difference between receptions of radiation from the first and second ones of the fixed radio frequency identifiers, determining, based on radiation received from each of the object-specific radio frequency identifiers, a movement indicator indicative of movement of the mobile device with respect to the object provided with the object-specific radio frequency identifier under consideration, and classifying a first one of the objects to be an object belonging to a load of the mobile device and a second one of the objects to be an object non-belonging to the load of the mobile device in response to a situation in which i) the computed speed estimate exceeds a threshold and ii) the movement indicator related to the second one of the objects is indicative of a greater movement speed than the movement indicator related to the first one of the objects.

In accordance with the invention, there is also provided a new computer program for classifying objects based on radiation received at a mobile device from object-specific radio frequency identifiers attached to the objects and on radiation received at the mobile device from fixed radio frequency identifiers attached to one or more fixed structures located in an operating environment of the mobile device.

A computer program according to the invention comprises computer executable instructions for controlling a programmable processor to:

compute a speed estimate for the mobile device based on a distance between first and second ones of the fixed radio frequency identifiers and a time-difference between receptions of radiation from the first and second ones of the fixed radio frequency identifiers, determine, based on radiation received from each of the object-specific radio frequency identifiers, a movement indicator indicative of movement of the mobile device with respect to the object provided with the object-specific radio frequency identifier under consideration, and classify a first one of the objects to be an object belonging to a load of the mobile device and a second one of the objects to be an object non-belonging to the load of the mobile device in response to a situation in which i) the computed speed estimate exceeds a threshold and ii) the movement indicator related to the second one of the objects is indicative of a greater movement speed than the movement indicator related to the first one of the objects.

In accordance with the invention, there is provided also a new computer program product. The computer program product comprises a non-volatile computer readable medium, e.g. a compact disc "CD", encoded with a computer program according to the invention.

Exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of un-recited features.

The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF THE DRAWINGS

Exemplifying and non-limiting embodiments and their advantages are explained in greater detail below in the sense of examples and with reference to the accompanying drawings, in which.

DESCRIPTION OF THE PREFERRED EMBODIMENTS

The specific examples provided in the description below should not be construed as limiting the scope and/or the applicability of the accompanied claims. Lists and groups of examples provided in the description are not exhaustive unless otherwise explicitly stated.

Figure 1A:
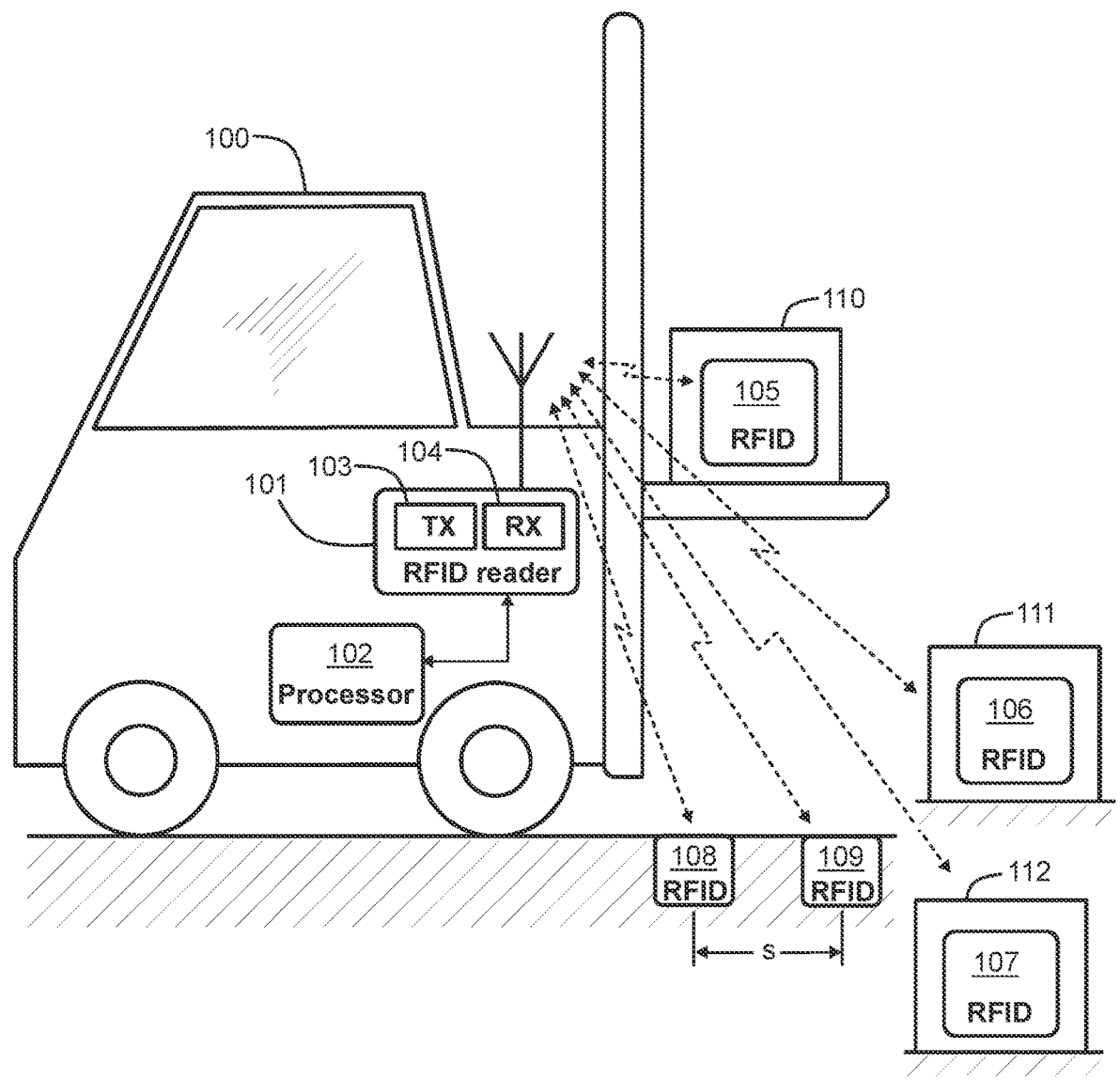
FIGS. 1a and 1b illustrate a system for handling objects, the system comprising a mobile device according to an exemplifying and non-limiting embodiment for handling the objects.
Figure 1B:
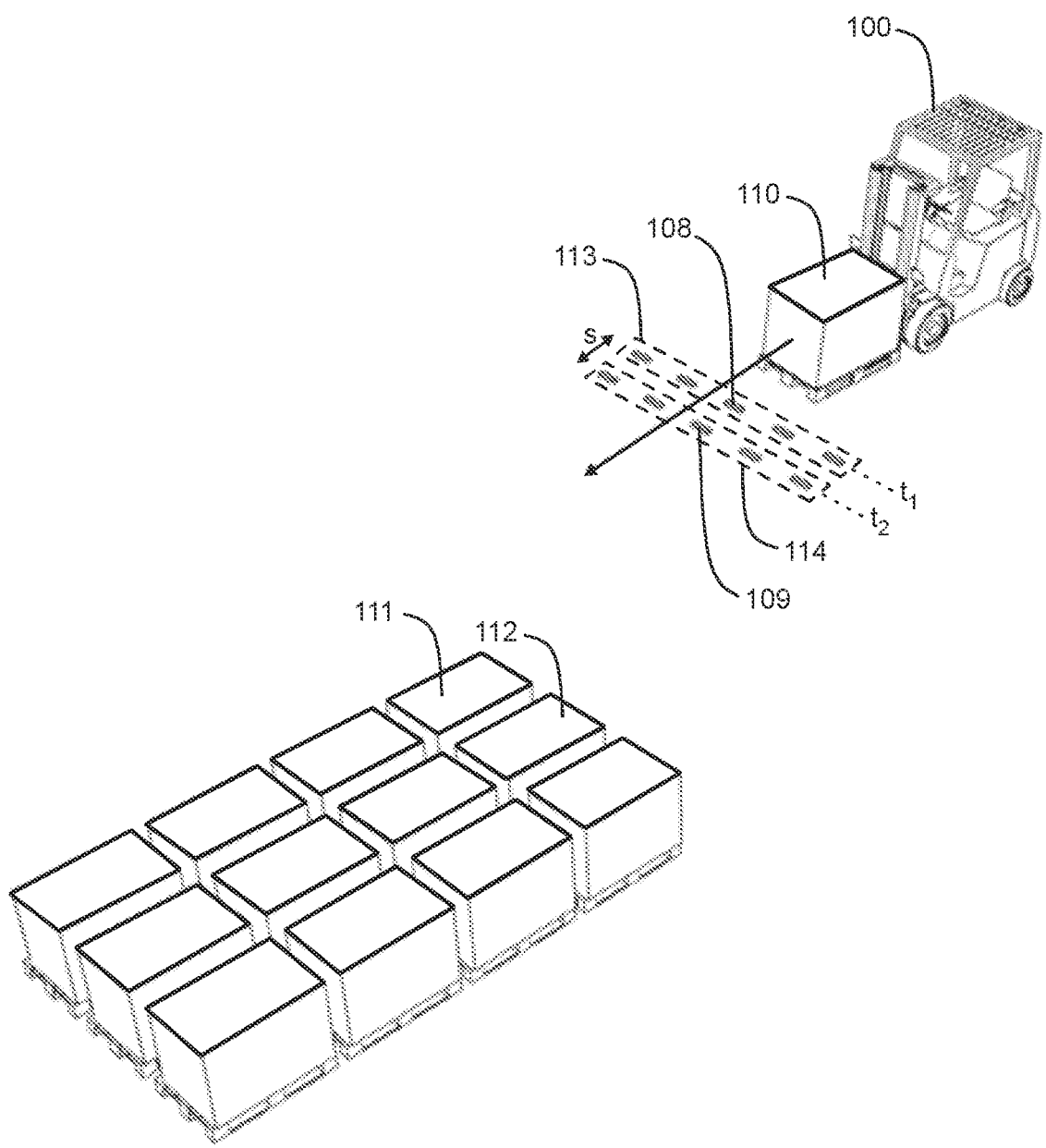

FIGS. 1a and 1b illustrate a system for handling objects. In FIGS. 1a and 1b, three of the objects are denoted with references 110, 111, and 112. The system comprises a mobile device 100 according to an exemplifying and non-limiting embodiment for handling the objects. In this exemplifying case, the mobile device 100 is a forklift. The objects are provided with object-specific radio frequency identifiers "RFID". As illustrated in FIG. 1a, the objects 110, 111, and 112 are provided with radio frequency identifiers "RFID" 105, 106, and 107, respectively. The system comprises fixed radio frequency identifiers "RFID" attached to one or more fixed structures located in an operating environment of the mobile device 100. In this exemplifying case, fixed radio frequency identifiers are attached to a floor of a room in which the mobile device 100 operates. In FIGS. 1a and 1b, two of the fixed radio frequency identifiers are denoted with references 108 and 109. As shown in FIG. 1b, the fixed radio frequency identifiers are arranged to form two rows 113 and 114 so that the fixed radio frequency identifier 108 belongs to the row 113 and the fixed radio frequency identifier 109 belongs to the row 114.

The mobile device 100 comprises a radio frequency identifier reader "RFID-reader" 101 that comprises a radio receiver 104 for receiving radiation emitted by the object-specific RFIDs 105-107 and radiation emitted by the fixed RFIDs 108 and 109. Each of the RFIDs can be either a passive RFID, an active RFID, or a battery-assisted passive RFID. An active RFID has an on-board battery and periodically transmits radiation encoded with identification data. In exemplifying cases where each of the RFIDs 105-109 is an active RFID, the RFID-reader 101 does not necessarily comprise a radio transmitter. A battery-assisted passive RFID has a battery on board and is activated when it receives radio energy transmitted by a RFID-reader. A passive RFID is cheaper and smaller than an active RFID and a battery-assisted passive RFID because a passive RFID has no battery. Instead, a passive RFID uses the radio energy transmitted by a RFID-reader. In exemplifying cases where each of the RFIDs 105-109 is a passive RFID or a battery-assisted passive RFID, the RFID-reader 101 comprises a radio transmitter 103 for emitting radiation to excite the RFIDs 105-109 to emit radiation. Each of the object-specific RFIDs 105-107 can be a tag attached to the corresponding object to be identified. Correspondingly, each of the fixed RFIDs 108 and 109 can be a tag attached to the floor or another fixed structure.

The mobile device 100 further comprises a processing system 102 that is configured to compute a speed estimate v for the mobile device 100 based on a known distance between first and second ones of the fixed RFIDs and a time-difference between receptions of radiation from the first and second ones of the fixed RFIDs. In the exemplifying situation shown in FIGS. 1a and 1b, the first ones of the fixed RFIDs are the RFIDs forming the row 113 and the second ones of the fixed RFIDs are the RFIDs forming the row 114. Thus, the fixed RFID 108 belongs to the first ones of the fixed RFIDs and the fixed RFID 109 belongs to the second ones of the fixed RFIDs. In FIGS. 1a and 1b, the distance between first and second ones of the fixed RFIDs is denoted with s. The speed estimate v can be computed according to the following formula:

$$v = s/(t_2 - t_1),$$

where $t_2 - t_1$ is the time-difference between receptions of radiation from the first and second ones of the fixed RFIDs. The time-difference can be defined for example as a time-difference between maximum amplitudes of the radiations received from the first and second ones of the fixed RFIDs, or in some other suitable way. The invention is however not limited to any specific ways to define the time difference.

The processing system 102 is configured to determine, based on radiation received from each of the object-specific RFIDs 105-107, a movement indicator indicative of movement of the mobile device 100 with respect to the object provided with the object-specific RFID under consideration. In a mobile device according to an exemplifying and non-limiting embodiment, the processing system 102 is configured to determine a rate of change of a phase angle $d\varphi/dt$ of the radiation received from each of the object-specific RFIDs. In this exemplifying embodiment, the rate of change of the phase angle $d\varphi/dt$ represents the movement indicator related to the object-specific RFID under consideration. The rate of change of the phase angle can be measured e.g. during the time interval $t_1 \ldots t_2$ so that $$d\varphi/dt \approx (\varphi(t_2) - \varphi(t_1))/(t_2 - t_1),$$

where $\varphi$ is the phase angle of the radiation received from the object-specific RFID under consideration. It also possible to use the change $\varphi(t_2) - \varphi(t_1)$ as the movement indicator instead of the rate of change.

In a mobile device according to an exemplifying and non-limiting embodiment, the processing system 102 is configured to determine a rate of change of a signal strength of the radiation received from each of the object-specific RFIDs. In this exemplifying embodiment, the rate of change of the signal strength represents the movement indicator related to the object-specific RFID under consideration. The rate of change of the signal strength can be measured e.g. during the time interval $t_1 \ldots t_2$ so that $$dRSSI/dt \approx (RSSI(t_2) - RSSI(t_1))/(t_2 - t_1),$$

where RSSI is an indicator of the signal strength of the radiation received from the object-specific RFID under consideration. It also possible to use the change $RSSI(t_2) - RSSI(t_1)$ as the movement indicator instead of the rate of change.

In a mobile device according to an exemplifying and non-limiting embodiment, the processing system 102 is configured to determine a Doppler-shift of the radiation received from each of the object-specific RFIDs. In this exemplifying embodiment, the Doppler-shift represents the movement indicator related to the object-specific RFID under consideration.

In a mobile device according to an exemplifying and non-limiting embodiment, the processing system 102 is configured determine two or more of the following: i) the rate of change of the phase angle $d\varphi/dt$, ii) the rate of change of the received signal strength $dRSSI/dt$, and iii) the Doppler-shift of the received radiation, and to form each movement indicator based on these two or more determined quantities, e.g. as a weighted sum of the determined quantities.

The processing system 102 is configured to classify a first one or ones of the objects to be an object or objects belonging to a load of the mobile device 100 and a second one or ones of the objects to be an object or objects non-belonging to the load of the mobile device 100 in response to a situation in which
  i) the computed speed estimate v exceeds a threshold $v_{th}$, and
  ii) the movement indicator related to the second one or ones of the objects is indicative of a greater movement speed than the movement indicator related to the first one or ones of the objects.

In the exemplifying situation shown in FIGS. 1a and 1b, the object 105 is classified to be an object that belongs to the load of the mobile device 100 and the objects 106 and 107 are classified to be objects that do not belongs to the load of the mobile device 100.

It is worth noting that the RFID-reader 101 and the processing system 102 are presented in FIG. 1a as functional entities, and thus their presentation in FIG. 1a does not represent any limitations concerning their physical implementation. For example, the RFID-reader 101 and the processing system 102 can be implemented with a same physical device or with separate physical devices. For example, the processing system 102 can be implemented for example with one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". The processing system 102 may further comprise memory implemented for example with one or more memory circuits each of which can be e.g. a random-access memory "RAM" device.

Figure 2:
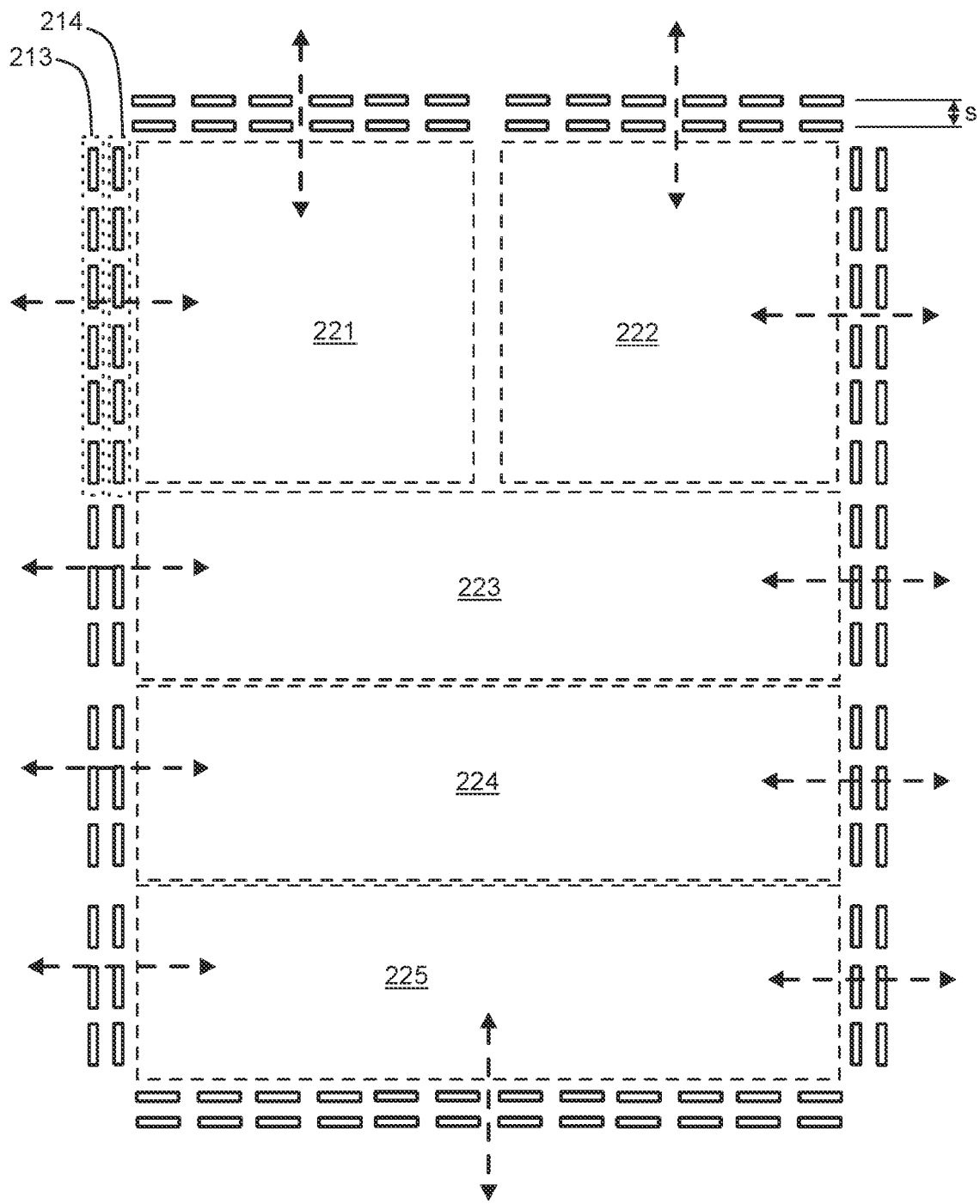
FIG. 2 illustrates a schematic layout of a system according to an exemplifying and non-limiting embodiment for handling objects.

FIG. 2 illustrates a schematic layout of a system according to an exemplifying and non-limiting embodiment for handling objects. In this exemplifying case, the fixed radio frequency identifiers "RFID" are attached to a floor or a ground on which one or more mobile devices for moving the objects, e.g. one or more forklifts, is/are configured to operate. The floor or ground is divided into areas 221, 222, 223, 224, and 225. Two or three boundaries of each of the areas are provided with two rows of fixed radio frequency identifiers "RFID". In FIG. 2, two of the rows of the fixed RFIDs are denoted with references 213 and 214. A distance between adjacent rows is denoted with s. In FIG. 2, paths of a mobile device, e.g. a forklift, for moving objects to and from the areas 221-225 are depicted with two-headed dashed line arrows.

Figure 3:
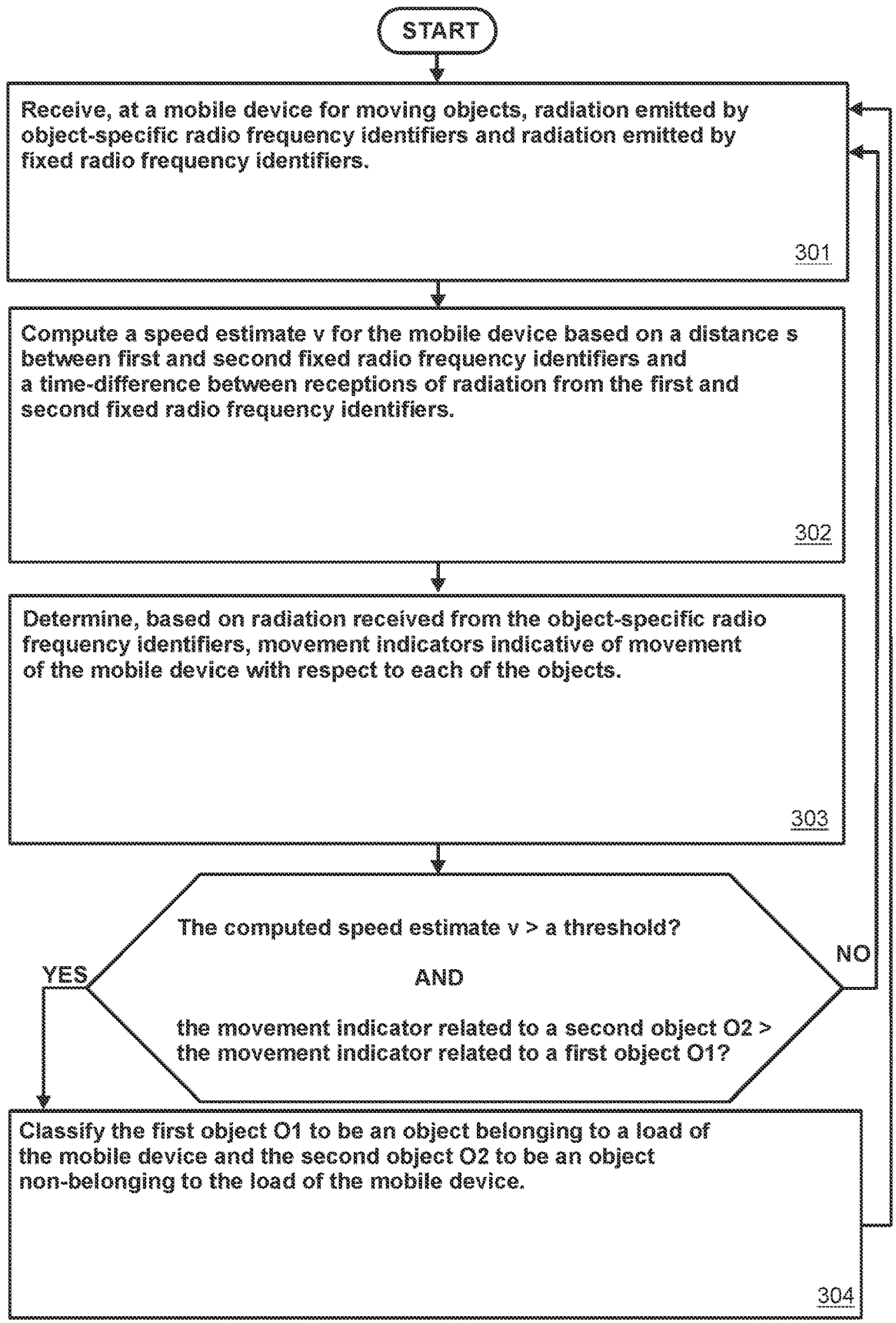
FIG. 3 shows a flowchart of a method according to an exemplifying and non-limiting embodiment for handling objects.

FIG. 3 shows a flowchart of a method according to an exemplifying and non-limiting embodiment for handling objects each being provided with an object-specific radio frequency identifier. The method comprises the following actions:

action 301: receiving, at a mobile device for moving the objects, radiation emitted by the object-specific radio frequency identifiers and radiation emitted by fixed radio frequency identifiers attached to one or more fixed structures, e.g. a floor, located in an operating environment of the mobile device, action 302: computing a speed estimate v for the mobile device based on a distance s between first and second ones of the fixed radio frequency identifiers and a time-difference between receptions of radiation from the first and second ones of the fixed radio frequency identifiers, action 303: determining, based on radiation received from each of the object-specific radio frequency identifiers, a movement indicator indicative of movement of the mobile device with respect to the object provided with the object-specific radio frequency identifier under consideration, and action 304: classifying a first one of the objects to be an object belonging to a load of the mobile device and a second one of the objects to be an object non-belonging to the load of the mobile device in response to a situation in which i) the computed speed estimate exceeds a threshold and ii) the movement indicator related to the second one of the objects is indicative of a greater movement speed than the movement indicator related to the first one of the objects.

A method according to an exemplifying and non-limiting embodiment comprises determining a rate of change of a phase angle of the radiation received from each of the object-specific radio frequency identifiers, where the rate of change of the phase angle is at least a part of the movement indicator related to the object-specific radio frequency identifier under consideration.

A method according to an exemplifying and non-limiting embodiment comprises determining a rate of change of a signal strength of the radiation received from each of the object-specific radio frequency identifiers, where the rate of change of the signal strength is at least a part of the movement indicator related to the object-specific radio frequency identifier under consideration.

A method according to an exemplifying and non-limiting embodiment comprises determining a Doppler-shift of the radiation received from each of the object-specific radio frequency identifiers, where the Doppler-shift is at least a part of the movement indicator related to the object-specific radio frequency identifier under consideration.

A method according to an exemplifying and non-limiting embodiment comprises emitting radiation from the mobile device to excite the object-specific radio frequency identifiers and the fixed radio frequency identifiers to emit radiation.

In a method according to an exemplifying and non-limiting embodiment, the mobile device is a forklift.

A computer program according to an exemplifying and non-limiting embodiment comprises computer executable instructions for controlling a programmable processor to carry out actions related to a method according to any of the above-described exemplifying embodiments.

A computer program according to an exemplifying and non-limiting embodiment comprises software modules for classifying objects based on:
  i) radiation received at a mobile device from object-specific radio frequency identifiers attached to the objects, and
  ii) radiation received at the mobile device from fixed radio frequency identifiers attached to one or more fixed structures located in an operating environment of the mobile device.

The software modules comprise computer executable instructions for controlling a programmable processor to:
  compute a speed estimate for the mobile device based on a distance between first and second ones of the fixed radio frequency identifiers and a time-difference between receptions of radiation from the first and second ones of the fixed radio frequency identifiers,
  determine, based on radiation received from each of the object-specific radio frequency identifiers, a movement indicator indicative of movement of the mobile device with respect to the object provided with the object-specific radio frequency identifier under consideration, and
  classify a first one of the objects to be an object belonging to a load of the mobile device and a second one of the objects to be an object non-belonging to the load of the mobile device in response to a situation in which i) the computed speed estimate exceeds a threshold and ii) the movement indicator related to the second one of the objects is indicative of a greater movement speed than the movement indicator related to the first one of the objects.

The above-mentioned software modules can be e.g. sub-routines or functions implemented with a suitable programming language.

A computer program product according to an exemplifying and non-limiting embodiment comprises a computer readable medium, e.g. a compact disc "CD", encoded with a computer program according to an exemplifying embodiment.

A signal according to an exemplifying and non-limiting embodiment is encoded to carry information defining a computer program according to an exemplifying embodiment.

The specific examples provided in the description given above should not be construed as limiting the scope and/or the applicability of the appended claims. Lists and groups of examples provided in the description given above are not exhaustive unless otherwise explicitly stated.

What is claimed is:

1. A mobile device for handling objects each being provided with an object-specific radio frequency identifier, the mobile device comprising a radio frequency identifier reader configured to receive radiation emitted by the object-specific radio frequency identifiers and radiation emitted by fixed radio frequency identifiers attached to one or more fixed structures located in an operating environment of the mobile device, wherein the mobile device further comprises a processing system configured to:
  compute a speed estimate for the mobile device based on a distance between first and second ones of the fixed radio frequency identifiers and a time-difference between receptions of radiation from the first and second ones of the fixed radio frequency identifiers, determine, based on radiation received from each of the object-specific radio frequency identifiers, a movement indicator indicative of movement of the mobile device with respect to the object provided with the object-specific radio frequency identifier under consideration, and classify a first one of the objects to be an object belonging to a load of the mobile device and a second one of the objects to be an object non-belonging to the load of the mobile device in response to a situation in which i) the computed speed estimate exceeds a threshold and ii) the movement indicator related to the second one of the objects is indicative of a greater movement speed than the movement indicator related to the first one of the objects.

2. The mobile device according to claim 1, wherein the processing system is configured to determine a rate of change of a phase angle of the radiation received from each of the object-specific radio frequency identifiers, the rate of change of the phase angle being at least a part of the movement indicator related to the object-specific radio frequency identifier under consideration.

3. The mobile device according to claim 1, wherein the processing system is configured to determine a rate of change of a signal strength of the radiation received from each of the object-specific radio frequency identifiers, the rate of change of the signal strength being at least a part of the movement indicator related to the object-specific radio frequency identifier under consideration.

4. The mobile device according to claim 1, wherein the processing system is configured to determine a Doppler-shift of the radiation received from each of the object-specific radio frequency identifiers, the Doppler-shift being at least a part of the movement indicator related to the object-specific radio frequency identifier under consideration.

5. The mobile device according to claim 1, wherein the radio frequency identifier reader comprises a radio transmitter configured to emit radiation to excite the object-specific radio frequency identifiers and the fixed radio frequency identifiers to emit radiation.

6. The mobile device according to claim 1, wherein the mobile device is a forklift.

7. A system for handling objects each being provided with an object-specific radio frequency identifier, the system comprising:

at least one mobile device for handling the objects, and fixed radio frequency identifiers attached to one or more fixed structures located in an operating environment of the mobile device, wherein the mobile device comprises a radio frequency identifier reader configured to receive radiation emitted by the object-specific radio frequency identifiers and radiation emitted by the fixed radio frequency identifiers, and the mobile device comprises a processing system configured to:

compute a speed estimate for the mobile device based on a distance between first and second ones of the fixed radio frequency identifiers and a time-difference between receptions of radiation from the first and second ones of the fixed radio frequency identifiers, determine, based on radiation received from each of the object-specific radio frequency identifiers, a movement indicator indicative of movement of the mobile device with respect to the object provided with the object-specific radio frequency identifier under consideration, and classify a first one of the objects to be an object belonging to a load of the mobile device and a second one of the objects to be an object non-belonging to the load of the mobile device in response to a situation in which i) the computed speed estimate exceeds a threshold and ii) the movement indicator related to the second one of the objects is indicative of a greater movement speed than the movement indicator related to the first one of the objects.

8. The system according to claim 7, wherein the fixed radio frequency identifiers are attached to a floor or a ground on which the mobile device is configured to operate.

9. The system according to claim 8, wherein the floor or ground is divided into areas and one or more boundaries of each of the areas are provided with two rows of the fixed radio frequency identifiers, a distance between the rows being the distance between the first and second ones of the fixed radio frequency identifiers.

10. A method for handling objects each being provided with an object-specific radio frequency identifier, the method comprising:

receiving, at a mobile device for moving the objects, radiation emitted by the object-specific radio frequency identifiers and radiation emitted by fixed radio frequency identifiers attached to one or more fixed structures located in an operating environment of the mobile device, computing a speed estimate for the mobile device based on a distance between first and second ones of the fixed radio frequency identifiers and a time-difference between receptions of radiation from the first and second ones of the fixed radio frequency identifiers, determining, based on radiation received from each of the object-specific radio frequency identifiers, a movement indicator indicative of movement of the mobile device with respect to the object provided with the object-specific radio frequency identifier under consideration, and classifying a first one of the objects to be an object belonging to a load of the mobile device and a second one of the objects to be an object non-belonging to the load of the mobile device in response to a situation in which i) the computed speed estimate exceeds a threshold and ii) the movement indicator related to the second one of the objects is indicative of a greater movement speed than the movement indicator related to the first one of the objects.

11. The method according to claim 10, wherein the method comprises determining a rate of change of a phase angle of the radiation received from each of the object-specific radio frequency identifiers, the rate of change of the phase angle being at least a part of the movement indicator related to the object-specific radio frequency identifier under consideration.

12. The method according to claim 10, wherein the method comprises determining a rate of change of a signal strength of the radiation received from each of the object-specific radio frequency identifiers, the rate of change of the signal strength being at least a part of the movement indicator related to the object-specific radio frequency identifier under consideration.

13. The method according to claim 10, wherein the method comprises determining a Doppler-shift of the radiation received from each of the object-specific radio frequency identifiers, the Doppler-shift being at least a part of the movement indicator related to the object-specific radio frequency identifier under consideration.

14. The method according to claim 10, wherein the method comprises emitting radiation from the mobile device to excite the object-specific radio frequency identifiers and the fixed radio frequency identifiers to emit radiation.

15. The method according to claim 10, wherein the mobile device is a forklift.

16. A non-volatile computer readable medium encoded with a computer program for classifying objects based on radiation received at a mobile device from object-specific radio frequency identifiers attached to the objects and on radiation received at the mobile device from fixed radio frequency identifiers attached to one or more fixed structures located in an operating environment of the mobile device, the computer program comprising computer executable instructions for controlling a programmable processor to:

compute a speed estimate for the mobile device based on a distance between first and second ones of the fixed radio frequency identifiers and a time-difference between receptions of radiation from the first and second ones of the fixed radio frequency identifiers, determine, based on radiation received from each of the object-specific radio frequency identifiers, a movement indicator indicative of movement of the mobile device with respect to the object provided with the object-specific radio frequency identifier under consideration, and classify a first one of the objects to be an object belonging to a load of the mobile device and a second one of the objects to be an object non-belonging to the load of the mobile device in response to a situation in which i) the computed speed estimate exceeds a threshold and ii) the movement indicator related to the second one of the objects is indicative of a greater movement speed than the movement indicator related to the first one of the objects.

* * * * *